UNITED STATES PATENT OFFICE.

HEINRICH CLINGESTEIN, OF MÜLHEIM, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

AZO COLORS SUITABLE FOR USE AS PIGMENTS.

1,076,819.     Specification of Letters Patent.     Patented Oct. 28, 1913.

No Drawing.     Application filed May 9, 1913. Serial No. 766,649.

*To all whom it may concern:*

Be it known that I, HEINRICH CLINGESTEIN, doctor of philosophy, chemist, citizen of the German Empire, residing at Mülheim, near Cologne-on-the-Rhine, Germany, have invented new and useful Improvements in New Azo Colors Suitable for Use as Pigments, of which the following is a specification.

My invention relates to the manufacture and production of new azo-coloring matters which are prepared by the combination of the diazo compounds of halogenated aromatic amins, such as ortho-chloro-anilin, 2.5-dichloro-anilin, para-chloro-anilin, ortho-bromo-anilin, 2.4-dichloro-anilin, ortho-chloro-para-toluidin with the condensation products obtained from aceto-acetic-ester and the alkylethers of para-aminophenols *e. g.* para-anisidin or para-phenetidin. The new products are after being dried and pulverized yellow powders, insoluble in water, soluble in concentrated sulfuric acid with a yellow coloration. They have most probably the following general formula:

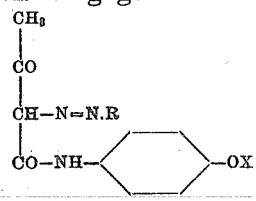

(R meaning a halogenated aromatic radical, X meaning an alkyl group, such as $-CH_3$, $-C_2H_5$).

These new dyes are particularly suitable for use as pigments. When used in the form of lakes, prepared from these dyes they possess brilliant greenish-yellow shades resembling zinc yellow and are distinguished by their fastness to light.

In order to illustrate the new process more fully the following example is given, the parts being by weight: 9.3 parts of ortho-chloro-anilin are diazotized with 5 parts of sodium nitrite and 20 parts of hydrochloric acid. The diazo solution is then poured into a suspension of 1500 parts of water and 15 parts of aceto-acetic-para-anisidid $CH_3-CO-CH_2-CO-NH.C_6H_4-OCH_3$ containing such a quantity of sodium acetate that the liquid is neutral to congo paper. When the combination is complete the residue is filtered off and washed with water. The dye thus obtained can be stirred to a paste. When dried it is a pure yellow powder having most probably the formula:

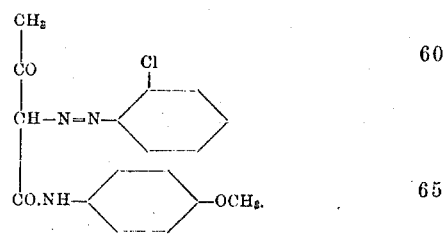

The lakes can be prepared *e. g.* according to the following prescription: Mix intimately 100 parts of a finely ground heavy spar with a solution of 20 parts of aluminium sulfate in 1200 parts of hot water and add thereto a boiling suspension of 6 parts of the azo dye obtained according to the first example in 1000 parts of water containing 10 parts of anhydrous sodium carbonate, boil the mixture and add to it while it is being stirred a hot solution of 30 parts of crystallized $BaCl_2$ in 300 parts water. Boil, filter off and wash. The color of this lake is greenish-yellow. The lakes and the coloring matter can also be produced in one operation.

The hitherto unknown aceto-acetic-acid-para-anisidid melts at 115–116° C. and the aceto-acetic-acid-para-phenetidid at 103–104° C.; white crystals, easily soluble in alcohol and hot benzene, difficultly soluble in ether.

I claim:—

1. As new products the new dyestuffs having most probably the following general formula:

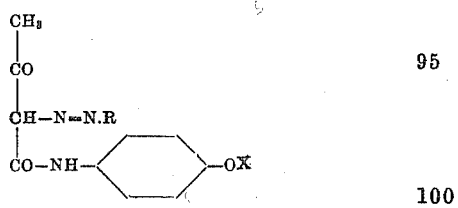

(R meaning a halogenated aromatic radical, X meaning an alkyl,) which are after being dried and pulverized yellow powders insoluble in water, soluble in concentrated sulfuric acid generally with a yellow coloration; furnishing valuable greenish-yellow color lakes resembling zinc yellow which are fast to light, substantially as described.

2. As a new product the new dyestuff derived from chloro-anilin and aceto-acetic-para-anisidid having most probably the following formula:

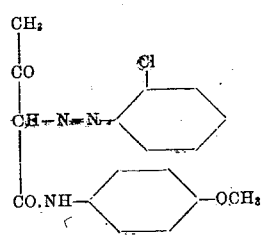

which is after being dried and pulverized a yellow powder insoluble in water, soluble in concentrated sulfuric acid with a yellow color; and furnishing valuable yellowish-green color lakes resembling zinc yellow which are fast to light, substantially as described.

In testimony whereof I have hereunto set my hand in the presence of two subscribing witnesses.

HEINRICH CLINGESTEIN. [L. S.]

Witnesses:
 HELEN NUFER,
 ALBERT NUFER.